United States Patent [19]

Romano

[11] Patent Number: 4,504,064
[45] Date of Patent: Mar. 12, 1985

[54] LASER PATH SEAL

[75] Inventor: Salvatore Romano, Trumbull, Conn.

[73] Assignee: Moore Special Tool Co., Inc., Bridgeport, Conn.

[21] Appl. No.: 414,980

[22] Filed: Sep. 7, 1982

[51] Int. Cl.³ .............................................. F16K 41/00
[52] U.S. Cl. ........................................ 277/12; 277/33; 277/DIG. 7
[58] Field of Search ................ 277/12, 33, 34, DIG. 7

[56] References Cited

U.S. PATENT DOCUMENTS 1,665,827  4/1928  Tillman .................................. 277/12
3,976,392  8/1976  Bolin ..................................... 277/33

OTHER PUBLICATIONS

Diaphragm Seals by R. A. North et al., Machine Design, Jun. 19, 1969.

Primary Examiner—Robert I. Smith
Attorney, Agent, or Firm—Kramer & Brufsky

[57] ABSTRACT

A rolling diaphragm seal is inserted between a pair of telescopic tubes containing a laser beam and a reflective mirror to preclude ambient air or lubricant from impinging on the mirror or for changing the density of the air within the tube to cause a change in intensity of the laser beam. The telescoping tube pairs can be used as part of a control system for the positioning of the beds of an ultra-precise machining apparatus such as found in turning and grinding machines for generating flat, spheric, and aspheric shapes, commonly known as aspheric generators. The rolling diaphragm seal consists of a rubber tube having its ends folded back upon itself and positioned between the inner and outer telescoping tubes of each pair. The ends of the seal tube are held apart in a retaining collar through which air can be inserted to pneumatically pressure the space between the folded back portions of the seal.

8 Claims, 4 Drawing Figures

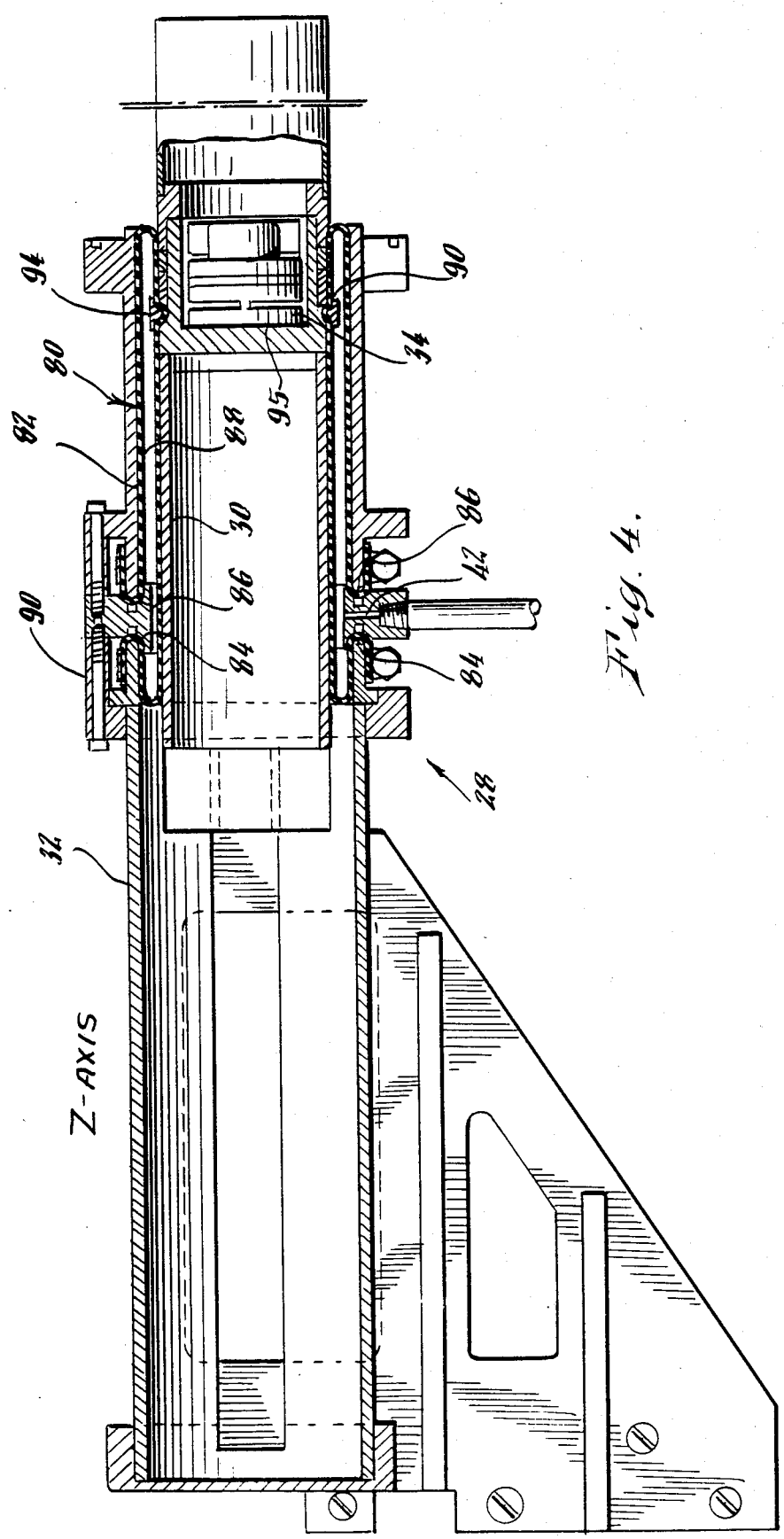

LASER PATH SEAL

BACKGROUND OF THE INVENTION

1. Field Of The Invention

This invention relates to a seal to assure an air tight laser optical path, and more particularly, a rolling diaphragm type seal used in connection with a laser control for an aspheric generator.

2. Description Of The Prior Art

An aspheric generator, such as that manufactured by the Moore Special Tool Co., Inc. of Bridgeport, Conn., is a three-axes computer numerically controlled precision maching apparatus designed to produce microinch finishes on a broad spectrum of materials. The apparatus can be used for single point diamond turning or for grinding. This dual capability allows a machinist to not only produce mirror quality finishes, but also to grind molds to crucial tolerances for optical lenses, and to handle other grinding tasks related to precision machining. In its diamond turning mode, the state of the art aspheric generator can produce finished optics on the machine and can be used for the production of discs used in the computer and photocopier fields. In its grinding mode, the aspheric generator can grind to tolerances of twenty millions of an inch ($0.5\mu m$) or better. This enables it to produce glass optical elements—spheres and aspheres—in most cases ready to polish, and ceramics for use as injection molding dyes which are used to produce plastic lenses.

High precision tolerances and resolution are achieved by the use of a laser feedback system to control the movement of the beds of the aspheric generator apparatus along the various axes, such as the X and Z linear axes of the apparatus. The laser feedback system is operated by a suitable computer program which outlines the work to be performed on the work piece held in the chuck of the machine.

The laser beams which control movement of the beds of the apparatus, which in turn produce the required movement of the tool against the work piece, which movement can be measured in microinches to produce the high quality finishes which are required, are generated and enclosed in telescoping tubes which also house a reflective mirror, an interferometer and a receiver to monitor the displacement; and through a comparison interferometer network, to cause movement of one of the two tubes provided on a linear axis, such as the X or Z axis to achieve the required motion of the bed and tool along that axis. The tubes are connected to the appropriate tool bed axis to develop the required movement.

The laser optical path in the laser feedback system tubes must be airtight. The humidity within the tubes must be controlled and lubricants must be precluded from impinging on the various mirror or interferometer surfaces within the tubes. In the former instance, a change in the density of the atmosphere within the tubes will effect the intensity of the laser beam and its reflective quality causing error in the movement of the tool. In the latter instance, if dirt or grease impinge upon any of the mirror surfaces, the apparatus must be cleaned and taken apart, resulting in considerable down time. Accordingly, a suitable seal between the telescoping tubes and the ambient environment must be maintained to preclude lubricant and dirt from entering the interior of the tubes and the density of the atmosphere within the tubes from being changed during operation of the apparatus.

Heretofore it has been common to use rolling diaphragm seals between telescoping parts, such as a piston and cylinder. As disclosed in the June 19, 1969 issue of "Machine Designing", as a piston moves in a cylinder, a rubber seal or sleeve connected between the cylinder and the piston will roll off the piston side wall onto the cylinder side wall. This effectively seals the space in the cylinder above the piston. The diaphragm consists of a single wall sleeve or tube having one end fixed to the cylinder and the end fixed to the piston and as indicated, rolls between the two elements as the piston travels linearly in the cylinder. However, where the length of travel of the telescoping parts is considerable, the ends of such a seal tend to frictionally roll against each other during the linear travel of the parts creating considerable drag or friction and resistance to movement. Where accuracy of movement in the millions of an inch category are required, as for example in an aspheric generator, such seals cannot be used because of the tendency of the material to drag against itself at its ends thereby impeding accurate movement. The same would be true of 0-ring seals and bellow-type seals, the latter being impeded by undue air friction in its expansion and contraction.

Accordingly, it is the primary object to this invention to provide an effective seal between a pair of telescoping tubes housing various laser components of a laser feedback system for an aspheric generator.

It is a further object of this invention to provide a seal of the type indicated which provides minimal frictional impedence of resistance to movement of the telescoping tubes housing the laser feedback components.

SUMMARY OF THE INVENTION

In accordance with the invention, a rolling diaphragm seal is inserted between a pair of telescopic tubes containing a laser beam and a reflective mirror to preclude ambient air or lubricant from impinging on the mirror or for changing the density of the air within the tube to cause a change in intensity of the laser beam. The telescoping tube pairs are connected to the slides which are a part of a control system for the positioning of the beds of an ultra-precise machining apparatus such as found in turning and grinding machines for generating flat, spheric, and aspheric shapes, commonly known as aspheric generators, by connecting a tube pair to the X and Z axis of the generator, respectively, and generating electrical signals to precisely position each tube pair and the bed along each axis in response to a change in displacement pulses generated from the laser beam.

The rolling diaphragm seal consists of a rubber tube having its ends folded back upon itself and positioned between the inner and outer telescoping tubes of each tube pair connected to the machine bed. The ends of the seal tube are held apart in a retaining collar through which air can be inserted to pneumatically pressure the space between the folded back portions of the seal. As the telescoping tubes of each pair move relative to the other, the spaced portions of the diaphragm seal will roll along the interior surface of the outer laser tube and exterior surface of the inner laser tube to form a rolling diaphragm seal with a minimum of friction between adjacent portions thereof due to the pneumatic spacing of the adjacent portions of the seal.

BRIEF DESCRIPTION OF THE DRAWINGS

Further objects and advantages of the present invention will become more apparent from the following specification and claims, and from the accompany drawings, wherein:

FIG. 4 is a cross-sectional view taken substantially along the plane indicated by line 4—4 of FIG. 2.

DETAILED DESCRIPTION OF THE PREFERRED EMBODIMENT

Figure 1:
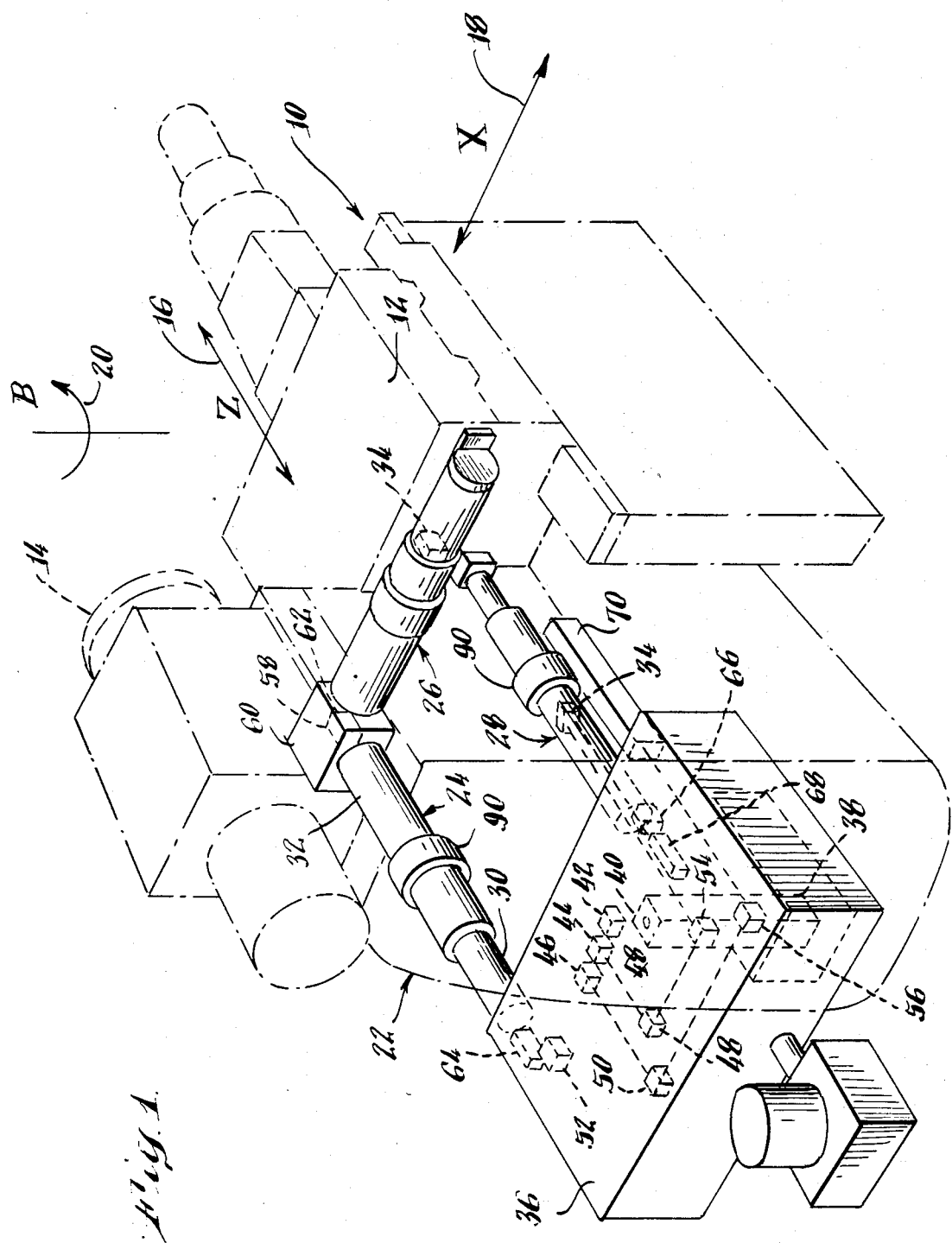
FIG. 1 is a perspective view of the components of a laser feedback control system for an aspheric generator which is indicated in phantom lines.
Figure 2:
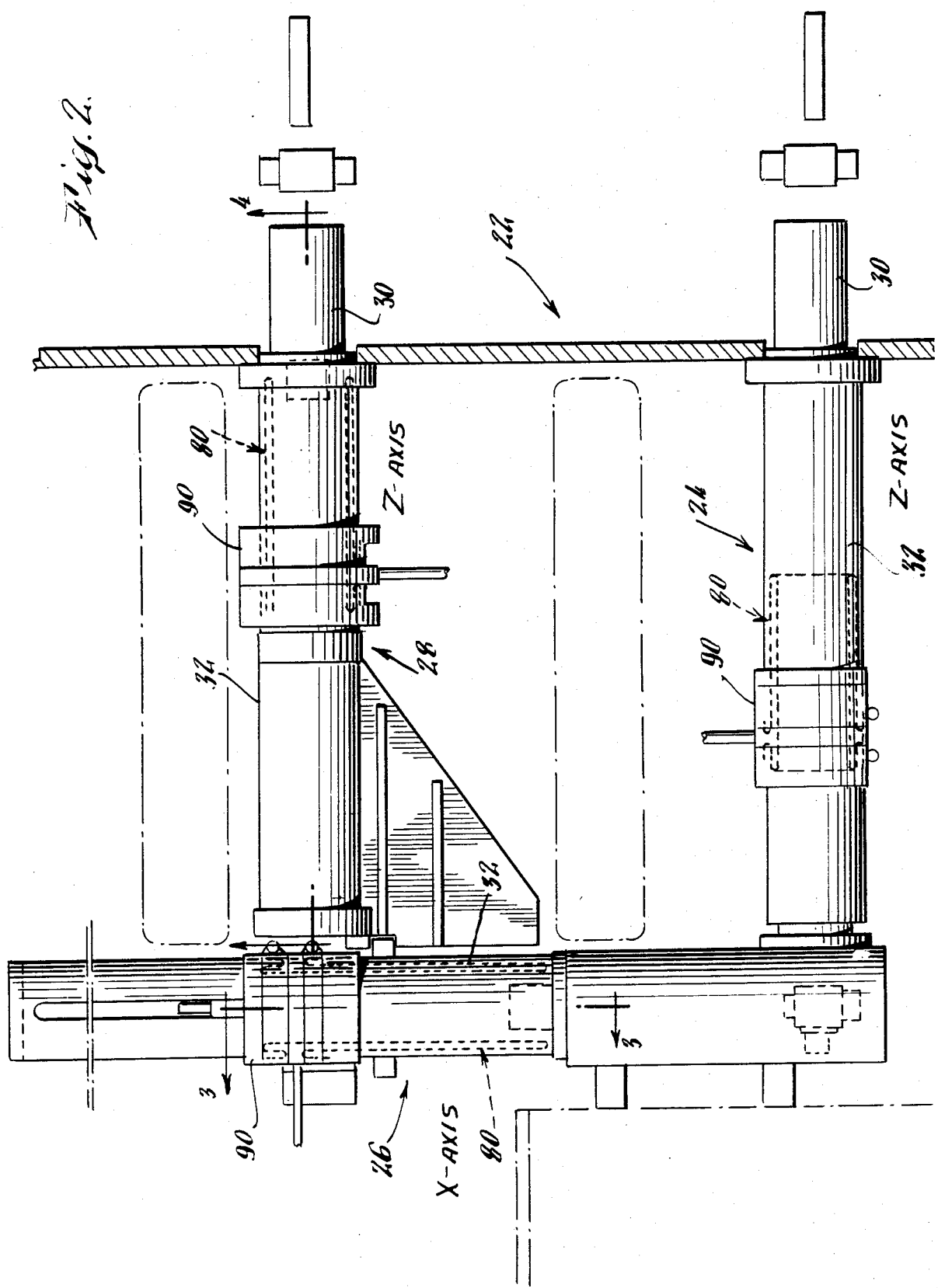
FIG. 2 is a top plan view of the components illustrated in FIG. 1.
Figure 3:
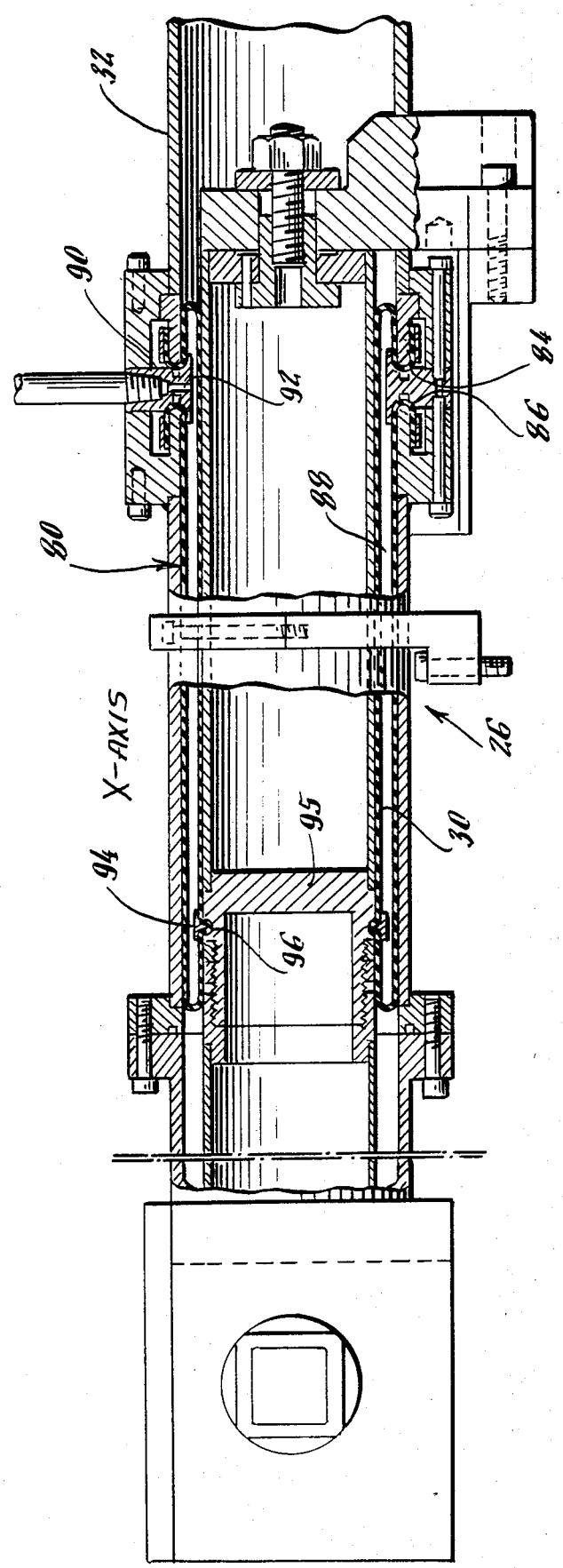
FIG. 3 is a cross-sectional view taken substantially along the plane indicated by line 3—3 of FIG. 2.

Referring now to the drawings in detail, wherein like numerals indicate like elements throughout the several views, an aspheric generator is indicated generally by the numeral 10 and in phantom in FIG. 1.

The aspheric generator 10 includes a bed 12 on which a tool can be mounted for grinding or turning a work piece held on a vacuum chuck 14. Movement of the bed 12 is adapted to be controlled along the "Z" axis 16 and "X" axis 18 of the apparatus although it would be understood that additional axes of the machine can be controlled such as the "B" rotational axis 20 and/or the "Y" axis lying in a plane perpendicular to the "Z" and "X" axes.

Movement of the bed 12 is controlled by a laser feedback system generally indicated by the numeral 22, which in turn is adapted to receive signals from a computer provided with a suitable program for directing movement of the bed 12. Generally, the laser feedback system is housed within three pair of telescoping tubes generally designated by the numerals 24, 26 and 28. Each pair of tubes 24, 26 and 28 includes a first inner tube 30 and a second telescoping outer tube 32. The smaller diameter inner tube 30 houses a reflector or mirror 34. The remaining components of the feedback system and optical system are isolated and housed within a sealed box 36.

The relative movement of the telescoping tube pairs 26 control movement of the bed 12 along the "X" axis of the apparatus 10 while two tube pairs 24, 28 control movement of the bed 12 and hence a tool along the "Z" axis of the apparatus.

A laser transducer 38 housed within sealed box 36 generates a given intensity laser beam 40 in response to a signal from a computer. The beam 40 is bent by a bender 42, and split by splitters 44 and 46 and fed through benders 48, 50 and 52. The benders 48 and 50 transmit the beam 40 to a second pair of benders 54 and 56, respectively, which also bend the beam 90°. The beam fed by bender 52 through tube pair 24 is bent by a bender 58 in a housing 60 and impinges upon a reflector or mirror 34 within tube pair 26, and is reflected back to an X-axis interferometer 62 within housing 60. The signal generated by interferometer 62 is transmitted to a receiver 64 within sealed box 36. The laser beam transmitted by bender 54 impinges upon a mirror 34 within tube pair 28. Mirror 34 within tube pair 28 reflects the beam to a Z-axis interferometer 66 which in turn feeds a signal to a receiver 68 within sealed box 36. The laser beam transmitted from bender 56 is fed to a Farrand compensator 70 where it can be compared with the reflected beams received by receiver 64 and 68 to cause movement of bed 12 by the use of appropriate drives and motors to precisely control the movement of a tool mounted on bed 12.

In order to preclude the density of the ambient air within each tube pair 24, 26 and 28 from changing and to preclude lubricant or dirt from impinging on the mirrors within the tube pairs, which can effect operation of the laser feedback system and thereby the precise control of movement of the tool against the work piece, a rolling diaphragm seal generally designated by the numeral 80 is provided between each outer tube 32 and inner tube 30 of each tube pair 24, 26 and 28 of the laser feedback system 22.

Seal 80 includes a flexible rubber tube 82 having its ends folded back on itself to provide a pair of spaced annular ends 84 and 86 defining a chamber 88 therebetween. The spaced ends 84 and 86 are fastened to a suitable split clamp collar 90 provided on outer tube 30 of each pair of laser tubes 24, 26 and 28. The collar 90 includes an opening 92 through which air can be fed into the annular chamber 88 between the spaced portions of the flexible tubular seal 80 to inflate the same with a pressure of approximately 0.25 psi to maintain portions of the seal spaced from each other along its entire length to preclude one portion from collapsing and frictionally rubbing against the other.

A portion of the diaphragm 82 downstream from collar 90 is anchored by a clamp ring 94 to the outer surface of the inner tube 30 and a mirror housing 95. An O-ring is disposed between the outer surface of mirror housing 95 and clamp ring 94 to maintain minimum contact of the flexible diaphragm seal 82 with the outer surface of mirror housing 95.

In operation, the seal 82 effectively blocks the space between inner tube 30 and outer tube 32 of each laser tube pair 24, 26 and 28 from the ambient atmosphere and the introduction of lubricant, dirt or other foreign materials into the interior of either of the tubes through the space therebetween. By virtue of the introduction of pneumatic fluid between the spaced ends 84 and 86 of the seal 82 into chamber 88, frictional contact between a spaced portions of the seal is held to a minimum precluding undue drag on the precise movements of the telescoping tubes relative to each other. The spaced portions of the diaphragm-type seal 82 will roll off the wall of the outer tube 32 and onto wall of the inner tube 30 (and mirror housing 95) and vice-versa as the tubes move relative to each other, to maintain the seal between the tubes.

What is claimed as new is:

1. A rolling diaphragm seal to preclude introduction of foreign material between a pair of telescoping tubes comprising:
    a flexible tube folded back upon itself at opposite ends to form a chamber between spaced portions thereof to receive pneumatic fluid therein between the spaced ends of said tube,
    said flexible tube being located between the outer surface of said inner and the inner surface of said outer, telescoping tubes,
    the spaced ends of said flexible tube being fixed to the outer one of said telescoping tubes, and
    a portion of said flexible tube spaced from said spaced ends thereof being fixed to said inner tube.
2. The seal of claim 1 wherein said flexible tube is formed from rubber.

3. The seal of claim 1 wherein said inner telescoping tube includes a reflective mirror.

4. The seal of claim 1 wherein the portion of said flexible tube fixed to said inner telescoping tube is fixed to said inner telescoping tube by an annular clamping ring.

5. The seal of claim 4 including an O-ring between said flexible tube and annular clamping ring.

6. The seal of claim 1 wherein the spaced ends of said flexible tube are fixed to the outer one of said telescoping tubes by a clamp collar provided with an opening therethrough adapted to be connected to a source of pneumatic fluid, said opening being in communication with the chamber in said flexible tube through said spaced ends of said tube.

7. In an aspheric generator having a laser feedback system for controlling the precise movement of a tool bed of said generator, said laser feedback system including at least one pair of telescoping tubes connected along the X and Z axes of said tool bed housing components of said laser feedback system, the improvement comprising:
  a rolling diaphragm seal to preclude introduction of foreign material between a pair of telescoping tubes including
  a flexible tube located and fixed between the outer surface of said inner and the inner surface of said outer, telescoping tubes,
  said flexible tube being folded back upon itself at opposite ends to form a chamber between spaced portions thereof to receive pneumatic fluid therein between the spaced ends of said tube,
  the spaced ends of said flexible tube being fixed to the outer one of said telescoping tubes, and
  a portion of said flexible tube spaced from said spaced ends thereof being fixed to said inner telescoping tube.

8. In an aspheric generator in accordance with claim 7 wherein said flexible tube is formed from rubber.

* * * * *